(12) United States Patent
Miyauchi (10) Patent No.: US 11,106,405 B2
(45) Date of Patent: Aug. 31, 2021

(54) PRINTER AND PRINTER SEARCH SYSTEM (71) Applicant: TOSHIBA TEC KABUSHIKI KAISHA, Tokyo (JP)

(72) Inventor: Kazuo Miyauchi, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/735,755

(22) Filed: Jan. 7, 2020

(65) Prior Publication Data
US 2020/0285435 A1    Sep. 10, 2020

(30) Foreign Application Priority Data
Mar. 5, 2019    (JP) .............................. JP2019-040064
Nov. 5, 2019    (JP) .............................. JP2019-200522

(51) Int. Cl.
*G06F 3/12*    (2006.01)
*H04W 88/02*    (2009.01)
*H04W 88/08*    (2009.01)

(52) U.S. Cl.
CPC .......... *G06F 3/1236* (2013.01); *G06F 3/1204* (2013.01); *G06F 3/1231* (2013.01); *G06F 3/1292* (2013.01); *H04W 88/02* (2013.01); *H04W 88/08* (2013.01)

(58) Field of Classification Search
CPC .... G06F 3/1236; G06F 3/1204; G06F 3/1231; G06F 3/1292; H04W 88/02; H04W 88/08
USPC ...................................................... 358/1.15
See application file for complete search history.

(56) References Cited

U.S. PATENT DOCUMENTS

| 8,881,310 | B2 | 11/2014 | Hajj et al. | |
| 2012/0062947 | A1* | 3/2012 | Shozaki | G05B 19/409 |
| | | | | 358/1.15 |
| 2013/0321864 | A1* | 12/2013 | Jintsugawa | G06F 3/1292 |
| | | | | 358/1.15 |
| 2015/0268903 | A1* | 9/2015 | Baba | H04W 76/30 |
| | | | | 358/1.15 |
| 2016/0132856 | A1* | 5/2016 | Nishiie | G07G 1/0018 |
| | | | | 705/24 |
| 2016/0277619 | A1* | 9/2016 | Asai | H04W 52/028 |
| 2017/0070951 | A1* | 3/2017 | Takeuchi | H04W 48/20 |
| 2017/0171035 | A1* | 6/2017 | Lu | G06F 3/04817 |
| 2017/0339698 | A1* | 11/2017 | Takarabe | H04L 45/22 |
| 2019/0082289 | A1 | 3/2019 | Kwon | |
| 2019/0102116 | A1* | 4/2019 | Fukumoto | G06F 3/1268 |

FOREIGN PATENT DOCUMENTS

KR    20160076421    6/2016

OTHER PUBLICATIONS

Extended European Search Report for European Patent Application No. 20158461.2 dated Aug. 3, 2020.

* cited by examiner

*Primary Examiner* — Allen H Nguyen
(74) *Attorney, Agent, or Firm* — Amin, Turocy & Watson, LLP (57) ABSTRACT

A printer and a printer search system according to one embodiment include a communication interface and a control unit. The communication interface performs wireless communication with an external device. If the communication interface receives a search command from the external device, the control unit controls the communication interface to notify communication connection information to the external device.

17 Claims, 12 Drawing Sheets

PRINTER AND PRINTER SEARCH SYSTEM

CROSS-REFERENCE TO RELATED APPLICATION

This application is based upon and claims the benefit of priority from Japanese Patent Application No. 2019-040064, filed Mar. 5, 2019, and Japanese Patent Application No. 2019-200522, filed Nov. 5, 2019, the entire contents of which are incorporated herein by reference.

FIELD

Embodiments described herein relate generally to a printer having a function of, if the printer is lost, supporting a search for the printer by informing a user of a place where the printer is placed.

BACKGROUND

There is known a portable terminal that, if receiving a search command from an external device, transmits present position information to the external device. Such a portable terminal is capable of acquiring, with a GPS function, information concerning a position where the portable terminal is placed. If the portable terminal is lost, the portable terminal can support a search for the lost portable terminal by notifying the position information to the external device through wireless LAN communication or the like.

However, for example, if a device such as a portable printer not implemented with a position measuring function such as a GPS function is lost, a user cannot acquire position information of the device.

DETAILED DESCRIPTION

An object of embodiments is to enable a user to easily find a printer even if the user misplaces the printer.

In general, according to one embodiment, a printer includes a communication I/F (interface) and a control unit. The communication I/F performs wireless communication with an external device. If the communication I/F receives a search command from the external device, the control unit controls the communication I/F to notify communication connection information to the external device.

Embodiments for carrying out the invention are explained below with reference to the drawings.

First Embodiment

A portable printer 100 is explained as an example in a first embodiment.

Figure 1:
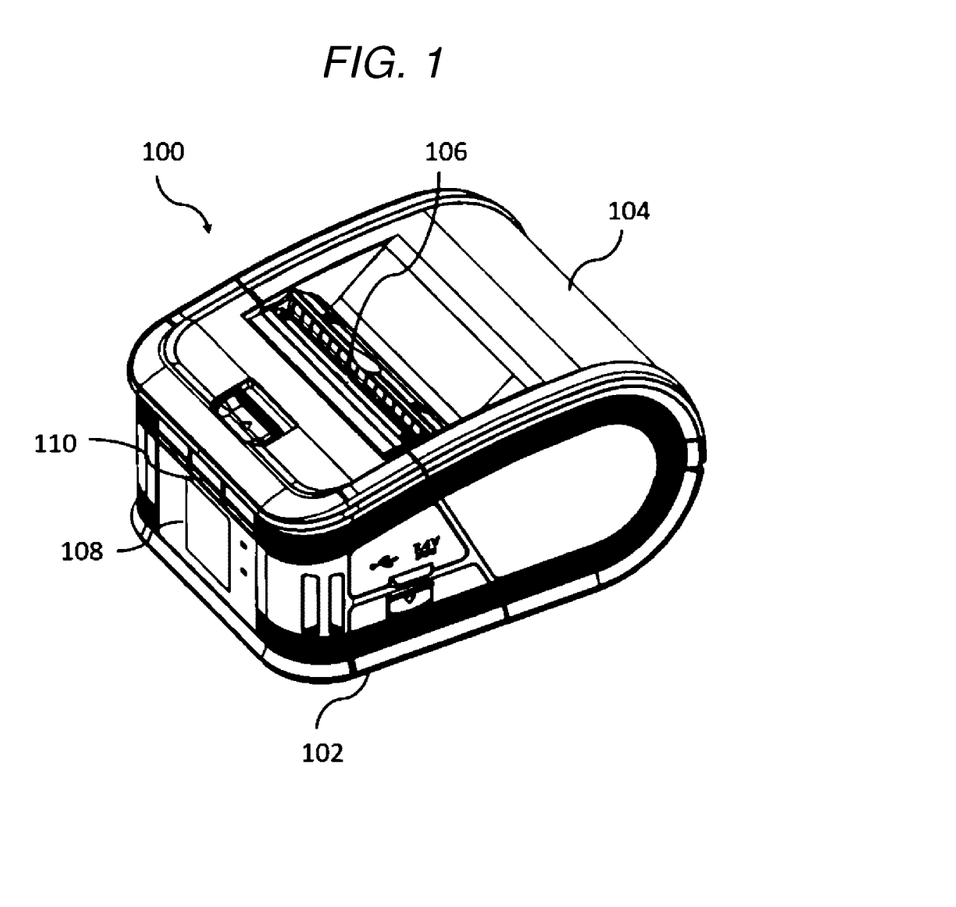
FIG. 1 is a perspective view of a printer in a first embodiment.
Figure 2:
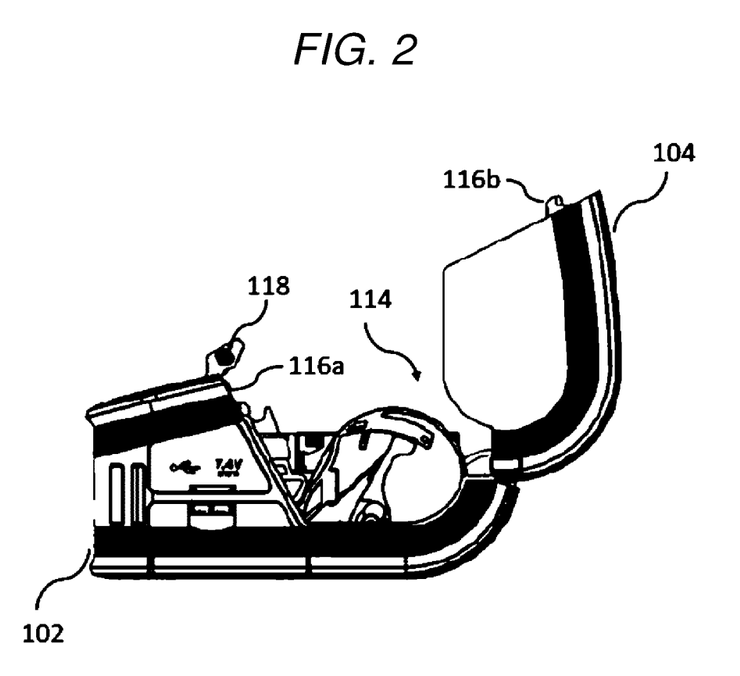
FIG. 2 is a side view of the printer.

The configuration of the printer 100 according to this embodiment is explained with reference to FIGS. 1 and 2. FIG. 1 is a perspective view illustrating the exterior of the printer 100 according to this embodiment. The printer 100 is divided into a main body unit 102 and a cover unit 104. FIG. 2 is a side view illustrating the exterior of the printer 100 in a state in which the cover unit 104 is open. The main body unit 102 is a container including an opening opened and closed by the cover unit 104. One end of the cover unit 104 is turnably attached to the main body unit 102. The cover unit 104 turns to open and close the opening of the main body unit 102.

The printer 100 includes a paper discharge port 106, a display unit 108, an operation unit 110, a communication I/F (interface) 112, a paper storing unit 114, a printing unit 116, and a peeling unit 118.

The paper discharge port 106 is a gap formed between the main body unit 102 and the cover unit 104 if the cover unit 104 is present in a closed position. Conveyed paper is discharged from the paper discharge port 106.

The display unit 108 displays various kinds of information. The various kinds of information are, for example, operation information, setting information, and error information. The display unit 108 is, for example, a liquid crystal screen or an LED lamp.

The operation unit 110 includes a plurality of operation buttons. If an operation button is pressed, the printer 100 transmits an operation signal to a processor 120 explained below and receives operation from a user.

The communication I/F 112 performs data communication with an external device 200 to receive, for example, printing data according to a control signal from a control unit 120 explained below. The external device 200 is a device such as a PC, a tablet, or a smartphone. The communication I/F 112 can perform wireless communication with the external device 200 through wireless LAN communication. The printer 100 performs the wireless LAN communication through an access point that emits a communication radio wave having the highest radio wave intensity among received communication radio waves. If there is no individual difference among access points, all of radio wave intensities of communication radio waves emitted by the access points are the same. Therefore, the intensities of the communication radio waves received by the printer 100 depend on distances between the printer 100 and the access points. That is, the printer 100 performs the wireless LAN communication through an access point set closest to the printer 100. The printer 100 may include short range wireless communication unit such as BLE (Bluetooth (registered trademark) Low Energy) in addition to wireless LAN communication unit.

The paper storing unit 114 stores a printing object. The printing object is, for example, receipt paper, label paper, and mount-less label paper. The receipt paper is belt-like paper that is cut after printing to be a receipt. The label paper is a label provided with an adhesive layer on the rear surface of a printing surface thereof and stuck to a belt-like mount. The mount-less label paper is belt-like label paper provided with an adhesive layer on the rear surface thereof and is cut after printing and used as a label. The printing object is rolled and stored in the paper storing unit 114.

The printing unit 116 performs printing by applying heat to the printing object based on image data to be printed. The printing unit 116 includes a thermal head 116a included in the main body unit 102 and a platen roller 116b included in the cover unit 104. In printing, the printing unit 116 holds the printing object with the thermal head 116a and the platen roller 116b in a state in which the cover unit 104 is disposed in a closed position. At this time, the thermal head 116a applies heat to the printing object and the platen roller 116b is driven to rotate to convey the printing object, whereby printing is performed. The printing unit 116 controls a heat generation state of a heat generating element of the thermal head 116a. Consequently, control of printing and non-printing on the printing object by the printing unit 116 is performed.

The peeling unit 118 is a mechanism for peeling a label from a mount. If printing is performed on the receipt paper or the mount-less label paper, the peeling unit 118 is not used and is housed in the main body unit 102. If printing is performed on the label paper, the peeling unit 118 is drawn out from the main body unit 102 and used. The drawn-out peeling unit 118 is set in a peeling position to be caught in an end portion on a far side from a turning axis of the cover unit 104 by closing the cover unit 104. In a peeling position, the peeling unit 118 is opposed to, via the label paper, the platen roller 116b included in the cover unit 104 and a not-illustrated peeling table. In the label paper conveyed by the platen roller 116b, the label is peeled from the mount by changing a conveying direction at an acute angle with the peeling table.

Figure 3:
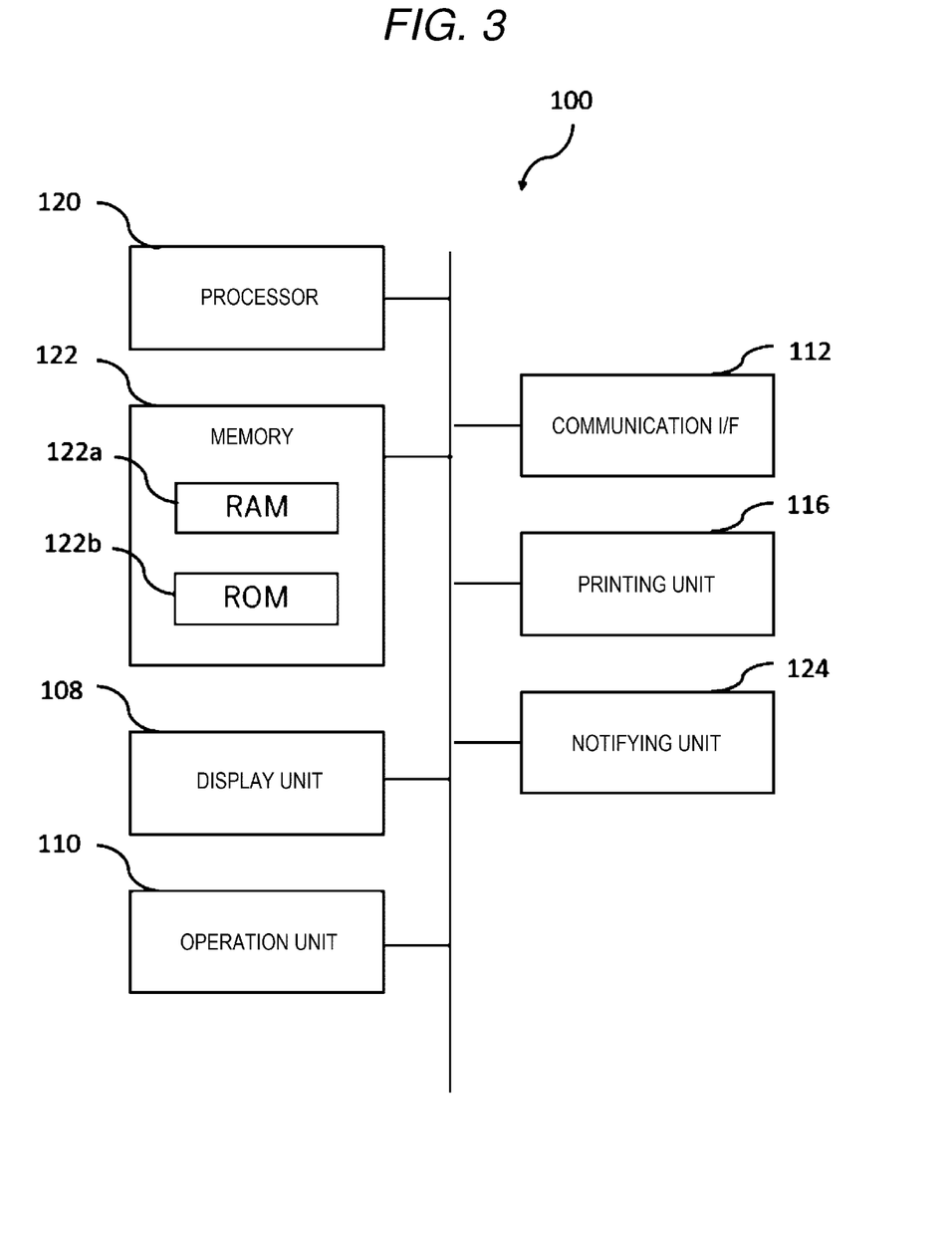
FIG. 3 is a block diagram illustrating a hardware configuration of the printer.

FIG. 3 is a block diagram illustrating a hardware configuration of the printer 100. The printer 100 includes a processor 120, a memory 122, the display unit 108, the operation unit 110, the communication I/F 112, the printing unit 116, and a notifying unit 124. Explanation is omitted about the components explained with reference to FIGS. 1 and 2.

The processor (the control unit) 120 includes a CPU (Central Processing Unit) or an MPU (Micro Processing Unit) that controls the operation of the entire printer 100. The memory (a storing unit) 122 is, for example, a semiconductor memory and includes a ROM (Read Only Memory) 122a that stores various control programs. For example, operation information, setting information, and an operation program correspond to the various control programs. The memory 122 includes a RAM (Random Access Memory) 122b that provides a temporary work region to the processor 120. Various kinds of processing information are stored in the RAM 122b. The processor 120 controls the units of the printer 100 based on the various control programs and the like stored in the ROM 122a.

The notifying unit 124 is configured by, for example, a speaker that emits sound, an LED that emits light, and a vibrating actuator. For example, if the communication I/F 112 communicates with the external device 200 or the like and receives data, the notifying unit 124 notifies the user to that effect with sound, light, vibration, or the like.

Figure 4:
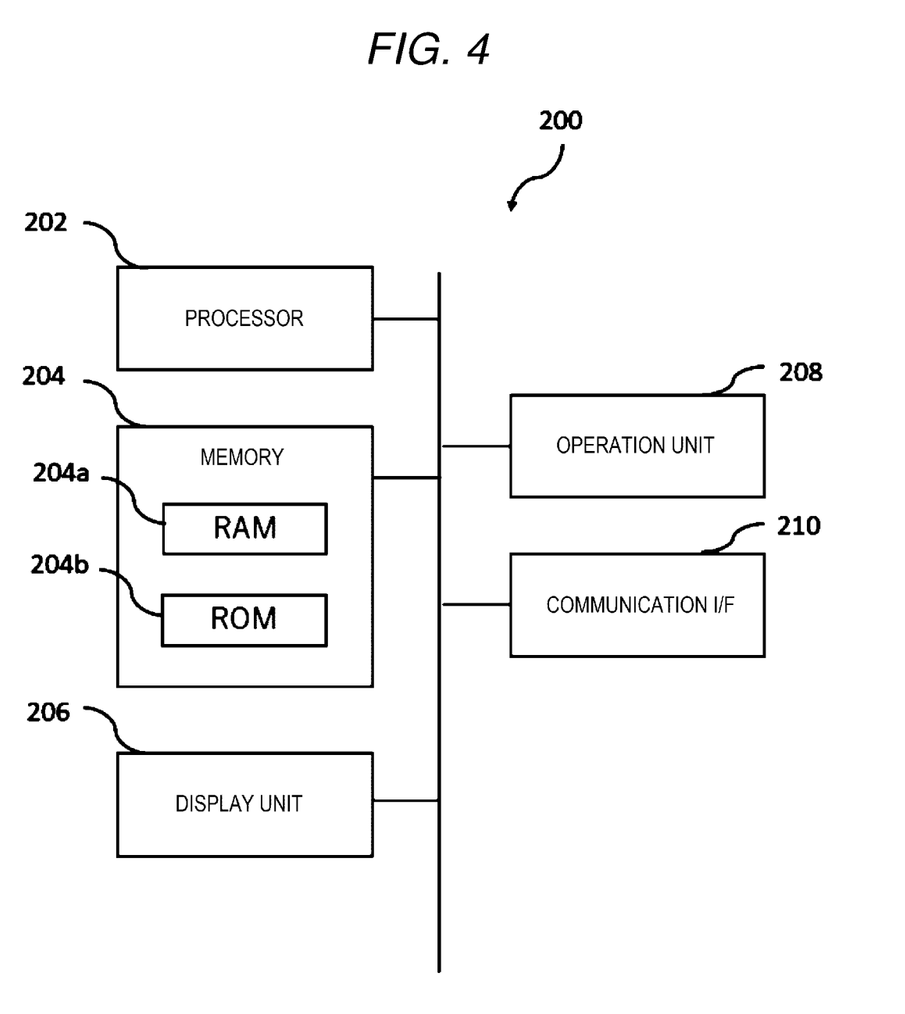
FIG. 4 is a block diagram illustrating a hardware configuration of an external device.

The configuration of the external device 200 is explained. FIG. 4 is a block diagram illustrating a hardware configuration of the external device 200. The external device 200 includes a processor 202, a memory 204, a display unit 206, an operation unit 208, and a communication I/F 210.

The processor (a control unit) 202 includes a CPU or an MPU that controls the operation of the entire external device 200. The memory (a storing unit) 204 is, for example, a semiconductor memory and includes a ROM 204a that stores various control programs. For example, operation information, setting information, and an operation program correspond to the various control programs. The memory 204 includes a RAM 204b that provides a temporary work region to the processor 202. Various kinds of processing information are stored in the RAM 204b. The processor 202 controls the units of the external device 200 based on the various control programs and the like stored in the ROM 204a.

The display unit 206 displays various kinds of information. The various kinds of information are, for example, operation information, setting information, and error information. The display unit 206 may be configured by a touch panel.

The operation unit 208 receives operation from the user to transmit an operation signal to the processor 202. The operation unit 208 may be configured by a touch panel.

The communication I/F 210 performs data communication with the printer 100 to transmit, for example, printing data according to a control signal from the processor 202. The communication I/F 210 is configured to be communicable with the printer 100 through the wireless LAN communication. In the wireless LAN communication, the communication I/F 210 performs wireless communication through an access point present near the printer 100. The external device 200 may include short range wireless communication means such as BLE in addition to the wireless LAN communication means.

Figure 5:
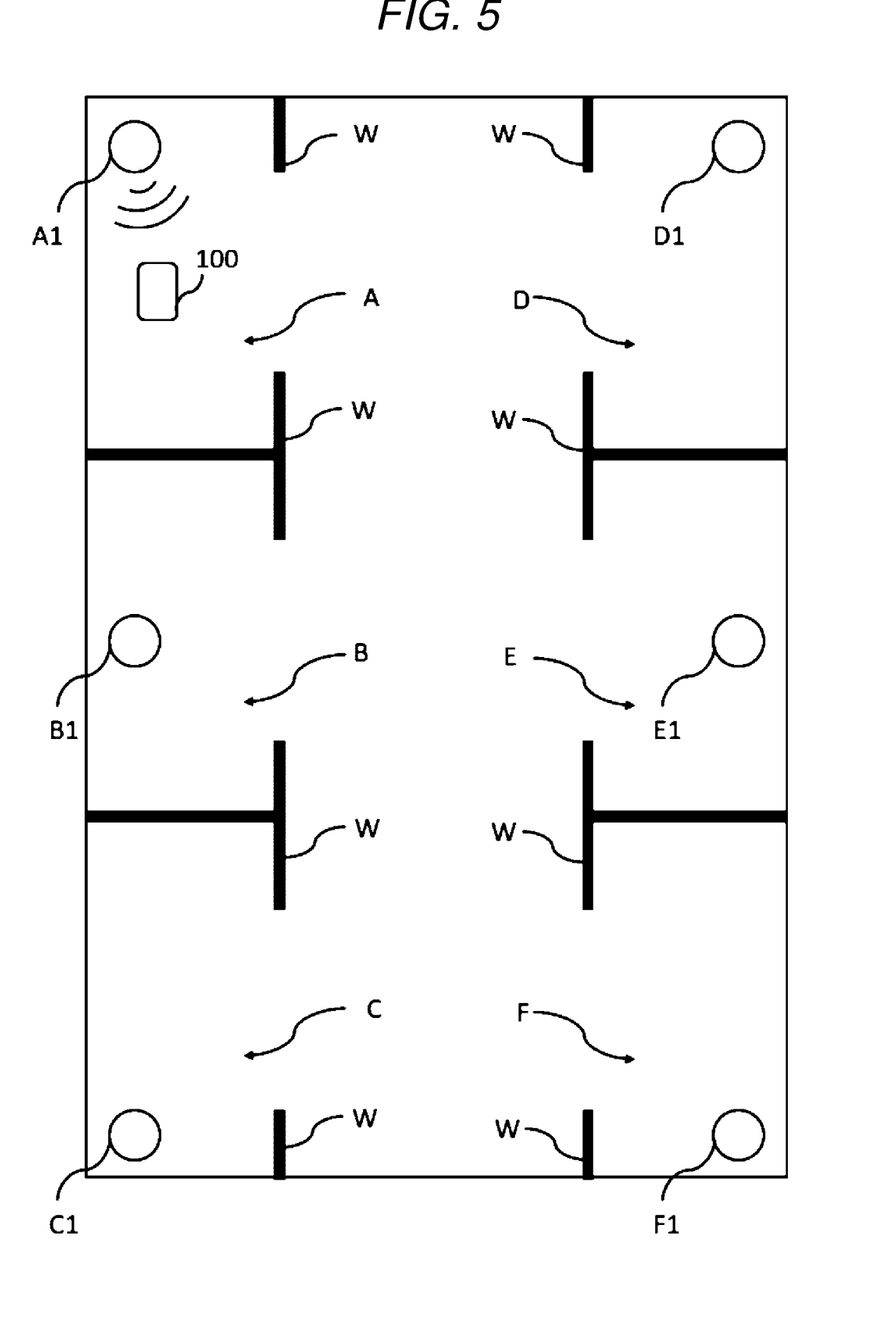
FIG. 5 is a plan view illustrating a positional relation between an access point and the printer.

FIG. 5 is a diagram illustrating a state in which the printer 100 is connected to an access point by the wireless LAN communication. A to F in FIG. 5 indicate floors A to F partitioned by walls W. Access points set in the floors A to F are indicated by A1 to F1.

Peculiar identification IDs are given to the access points A1 to F1. Usually, if setting access points, a setting person links and manages position information in a facility where the access points are set and identification ID information. That is, if an identification ID is known, a user or the like can specify a place where an access point having the identification ID is set.

For example, if the printer 100 is present in a position illustrated in FIG. 5, the printer 100 performs the wireless LAN communication via the access point A1, which is an access point closest to the printer 100. The printer 100 determines, based on intensities of communication radio waves received from the access points as explained above, to which access point the printer 100 is connected. That is, the printer 100 is connected to an access point at a transmission source of a strongest communication radio wave among the received communication radio waves. The intensities of the communication radio waves received by the printer 100 correlate with distances to the access points. Accordingly, the printer 100 is present near the access point at a connection destination. Therefore, if the access point at the connection destination is known, the user can estimate the position of the printer 100.

A misplacement notification mode of the printer 100 executed from the external device 200 in order to search for the printer 100 if the user actually loses the printer 100 is explained.

First, the external device 200 transmits a search command to the printer 100 via the wireless LAN communication or the short range wireless communication according to user operation on an application or an a WEB as explained below. If the communication I/F 112 receives the search command from the external device 200, the printer 100 shifts to the misplacement notification mode.

In the misplacement notification mode, the printer 100 acquires, from an access point to which the printer 100 is connected, an identification ID capable of identifying the access point and transmits information including the identification ID to the external device 200 of the user as communication connection information. The user can learn near which access point the printer 100 is placed referring to the identification ID received by the external device 200. Position information and identification IDs of access points may be linked and stored on a server, a PC, or a smartphone such that the user can refer to the position information and the identification IDs if the user receives a notification from an access point. For example, if receiving an identification ID from an access point, the user refers to position information and an identification ID of the access point stored on the smartphone or accesses the server and refers to position information and an identification ID of the access point in order to confirm the position of the access point. The user may reflect and display, on a map, the position information of the access point with the server, the smartphone, or the like based on the received identification ID.

Figure 6A:
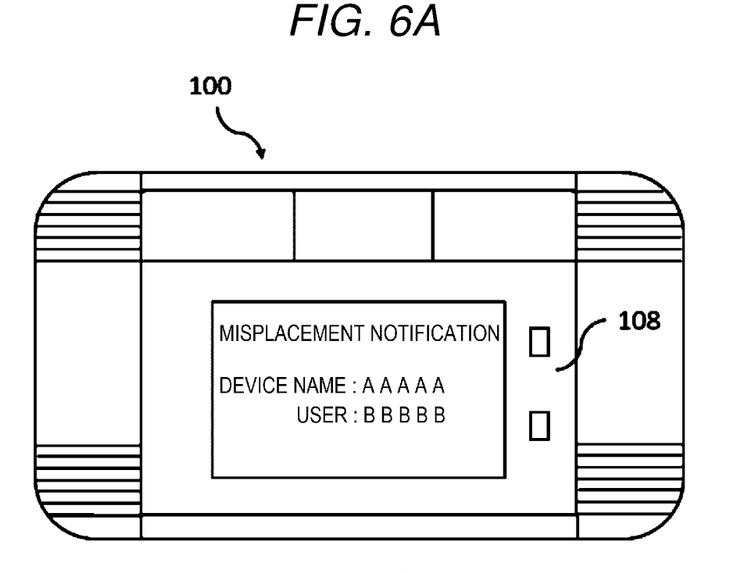
FIGS. 6A and 6B are diagrams illustrating screens for a misplacement notification.

FIGS. 6A and 6B illustrate examples of misplacement notifications. FIG. 6A is a diagram illustrating an example of a misplacement notification displayed on the display unit 108 of the printer 100. If shifting to the misplacement notification mode, the printer 100 displays a misplacement notification screen on the display unit 108. The misplacement notification screen displays misplacement notification information (for example, a message to the effect that the printer 100 is misplaced, a message to the effect that the user is searching for the printer 100, a device name of the printer 100, and a user name registered as an owner of the printer 100). In the misplacement notification mode, the printer 100 may display one of these kinds of information or may display a plurality of kind of information among these kinds of information. Consequently, even if a plurality of printers 100 are present within a search range, the user of the printer can easily identify a specific printer 100 that the user is searching for. If a person present near the printer 100 sees the misplacement notification, the person can easily take the printer 100 to the user.

The misplacement notification may be performed by a method other than the method of displaying the misplacement notification on the display unit 108. For example, the printer 100 may print, with the printing unit 116, misplacement notification information (for example, a message to the effect that the printer 100 is misplaced, a message to the effect that the user is searching for the printer 100, a device name of the printer 100, and a user name registered as an owner of the printer 100) on a printing object and discharge the printing object. With this method, information more than information displayable on the display unit 108 can be notified to the user and people present near the printer 100. Even the printer 100 not mounted with the display unit 108 can perform the misplacement notification. Further, power consumption can be reduced more than when the misplacement notification is displayed on the display unit 108.

Figure 6B:
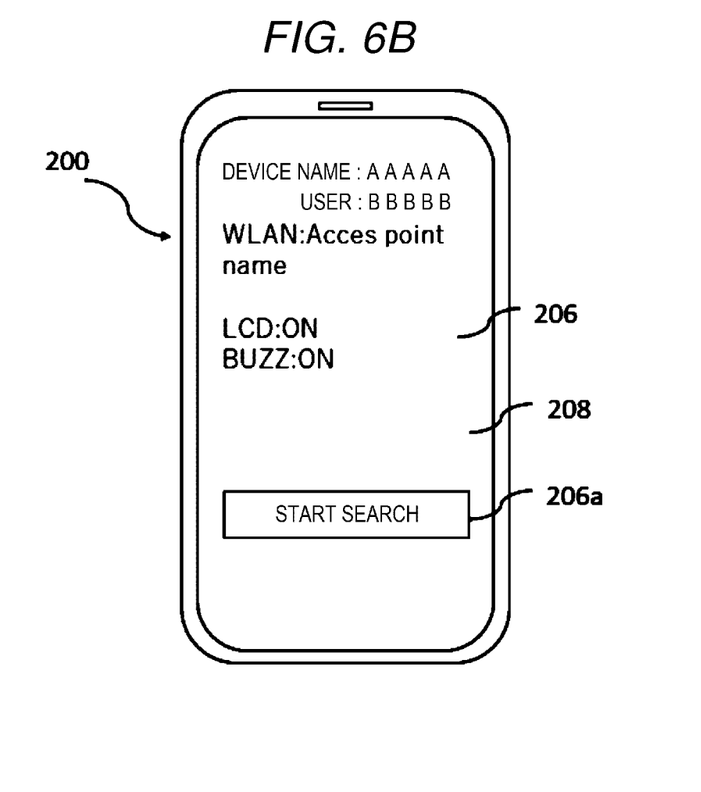

FIG. 6B is a diagram illustrating an example of a printer search screen displayed on the display unit 206 of the external device 200. A device name of the printer 100 being searched for, a user name registered as an owner of the printer 100, and communication connection information such as an identification ID of an access point to which the printer 100 is connected by the wireless LAN communication are displayed on the printer search screen as search information. A lighting button for lighting the display unit 108 of the printer 100 from the external device 200 side and a BUZZ button for sounding a buzzer may be displayed. The user can easily specify a place of the printer 100 by turning on these buttons. A printer search button 206a is displayed on the printer search screen. If the user presses this button, the external device 200 transmits a search command to the printer 100. The printer search screen may be a page on the WEB or may be displayed on an application installed in the external device 200.

Figure 7:
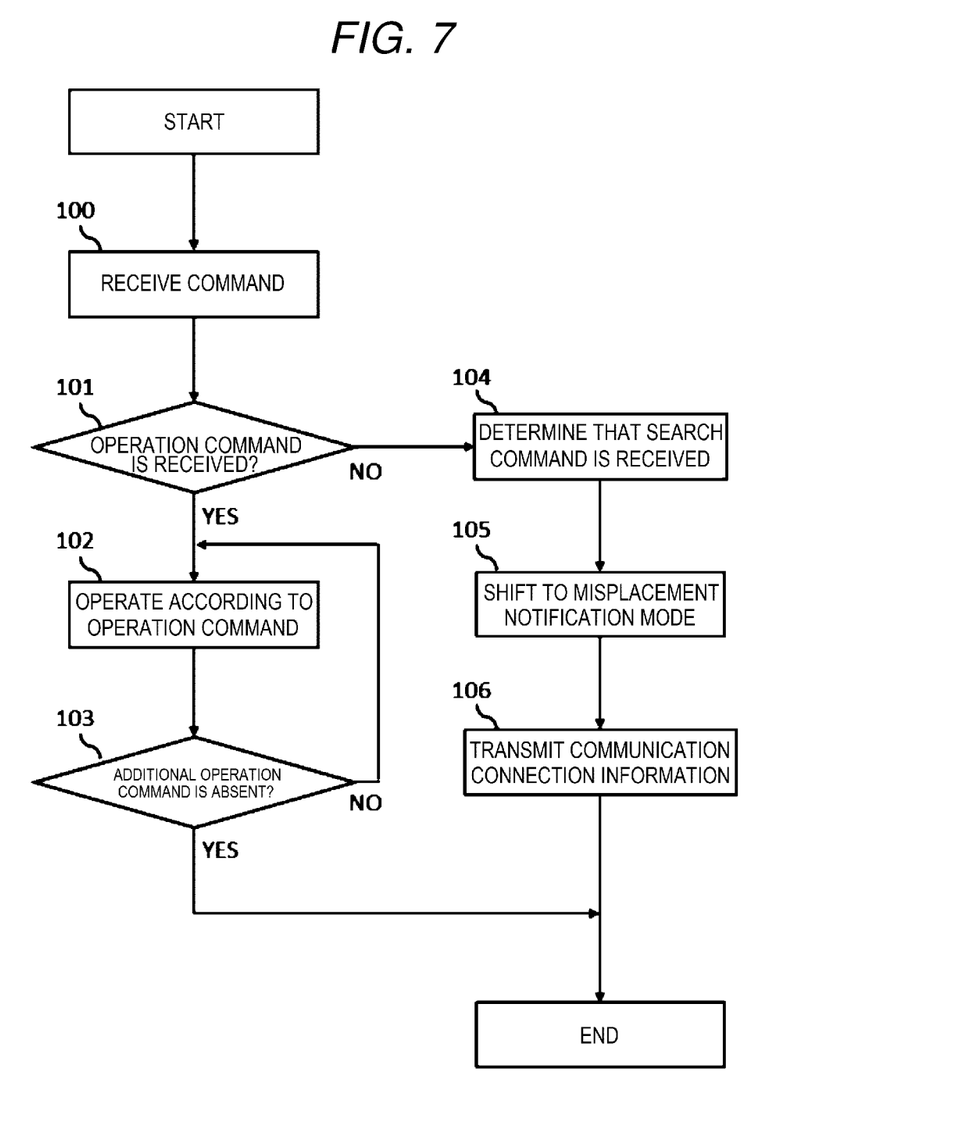
FIG. 7 is a flowchart illustrating misplacement notification processing for the printer.

FIG. 7 is a flowchart illustrating misplacement notification processing by the printer 100. In the following explanation, the printer 100 is in a standby state. The standby state is, for example, a state in which the printer 100 is turned on and is waiting for a printing job or a command from the user.

If receiving a command with the operation unit 110 or the communication I/F 112 (ACT 100), the printer 100 determines whether the received command is an operation command (ACT 101). The operation command is, for example, a command for executing a printing job. If the received command is the operation command (YES in ACT 101), the printer 100 performs operation based on the received operation command (ACT 102). If an additional operation command is present (NO in ACT 103), the printer 100 performs operation according to the operation command (ACT 102).

If an additional operation command is absent in ACT 103 (YES in ACT 103), the printer 100 ends a series of processing.

If not receiving an operation command with the operation unit 110 or the communication I/F 112 in ACT 101 (NO in ACT 101), the printer 100 determines that a search command is received from the external device 200 (ACT 104). If receiving the search command from the external device 200 (ACT 104), the printer 100 shifts to the misplacement notification mode (ACT 105). The printer 100 transmits, to the external device 200 that sends the search command, communication connection information including an identification ID of an access point to which the printer 100 is connected (ACT 106). Thereafter, the printer 100 ends the series of processing.

Figure 8:
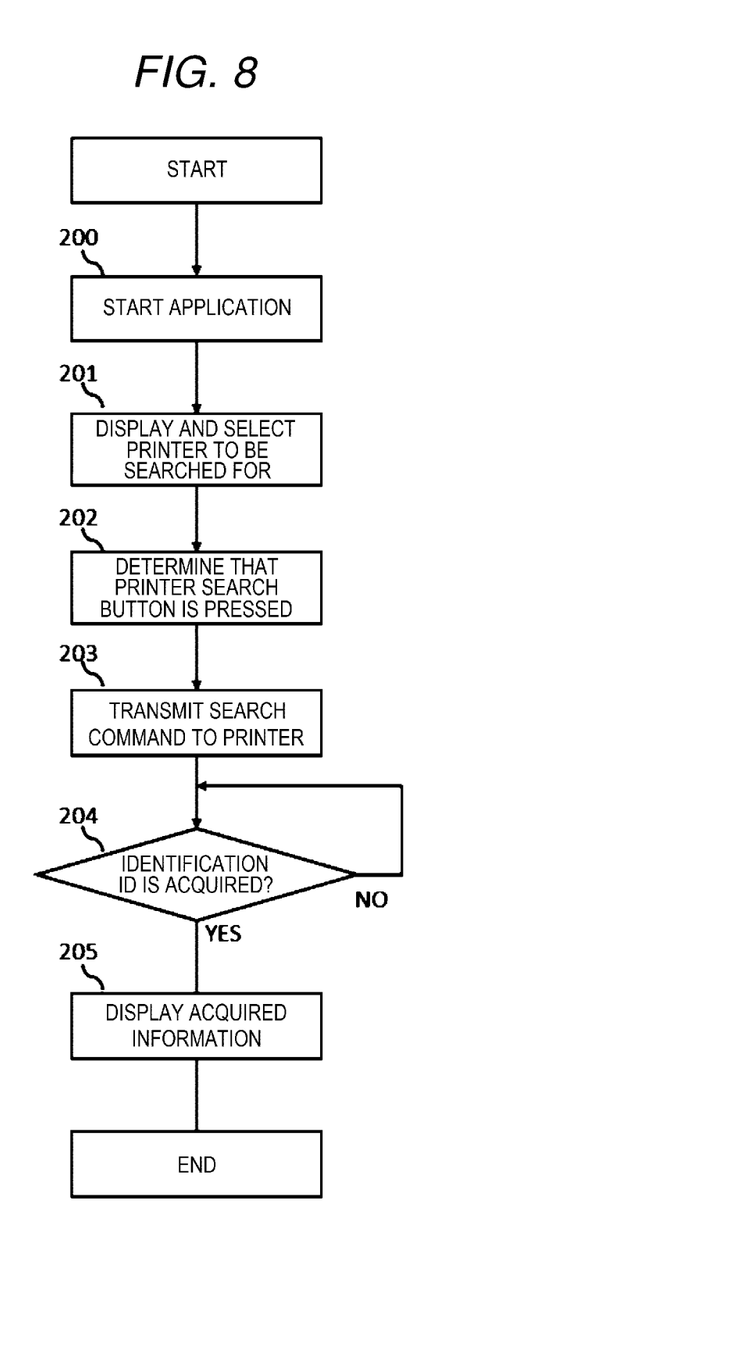
FIG. 8 is a flowchart illustrating printer search processing of an external device.

Search processing of the external device 200 is explained. FIG. 8 is a flowchart illustrating the search processing of the external device 200. In the following explanation, as an example, the external device 200 uses an application installed for a printer search. In the following explanation, the external device 200 is in a standby state.

If the user performs operation for starting the application for printer search, the external device 200 starts the application for printer search (ACT 200). The external device 200 displays the printer 100 to be searched for and receives selection of the printer 100 from the user (ACT 201). At this time, the external device 200 may display a list of printers 100 registered in advance and cause the user to select the printer 100 to be searched for or may cause the user to input information such as an ID allocated to the printer 100 in order to specify the printer 100. Thereafter, if the printer search button is pressed (ACT 202), the external device 200 transmits a search command to the printer 100 through wireless communication (ACT 203). Thereafter, the external device 200 stays on standby until the external device 200 acquires an identification ID from the printer 100 (NO in ACT 204). If acquiring an identification ID (YES in ACT 204), the external device 200 displays the acquired information on the display unit 206 (ACT 205). Thereafter, the external device 200 ends a series of processing if the user ends the operation of the application.

Consequently, if the printer according to this embodiment receives a search command from the external device, the printer notifies an identification ID of an access point to which the printer is connected. Therefore, the user receiving the notification can greatly narrow own a search range for the printer.

Second Embodiment

A printer capable of notifying misplacement of the printer even if the printer does not receive a search command from an external device is explained. For convenience of explanation, the same components as the components of the printer 100 explained in the first embodiment are not explained. The same reference numerals and signs are used for the components.

Figure 9:
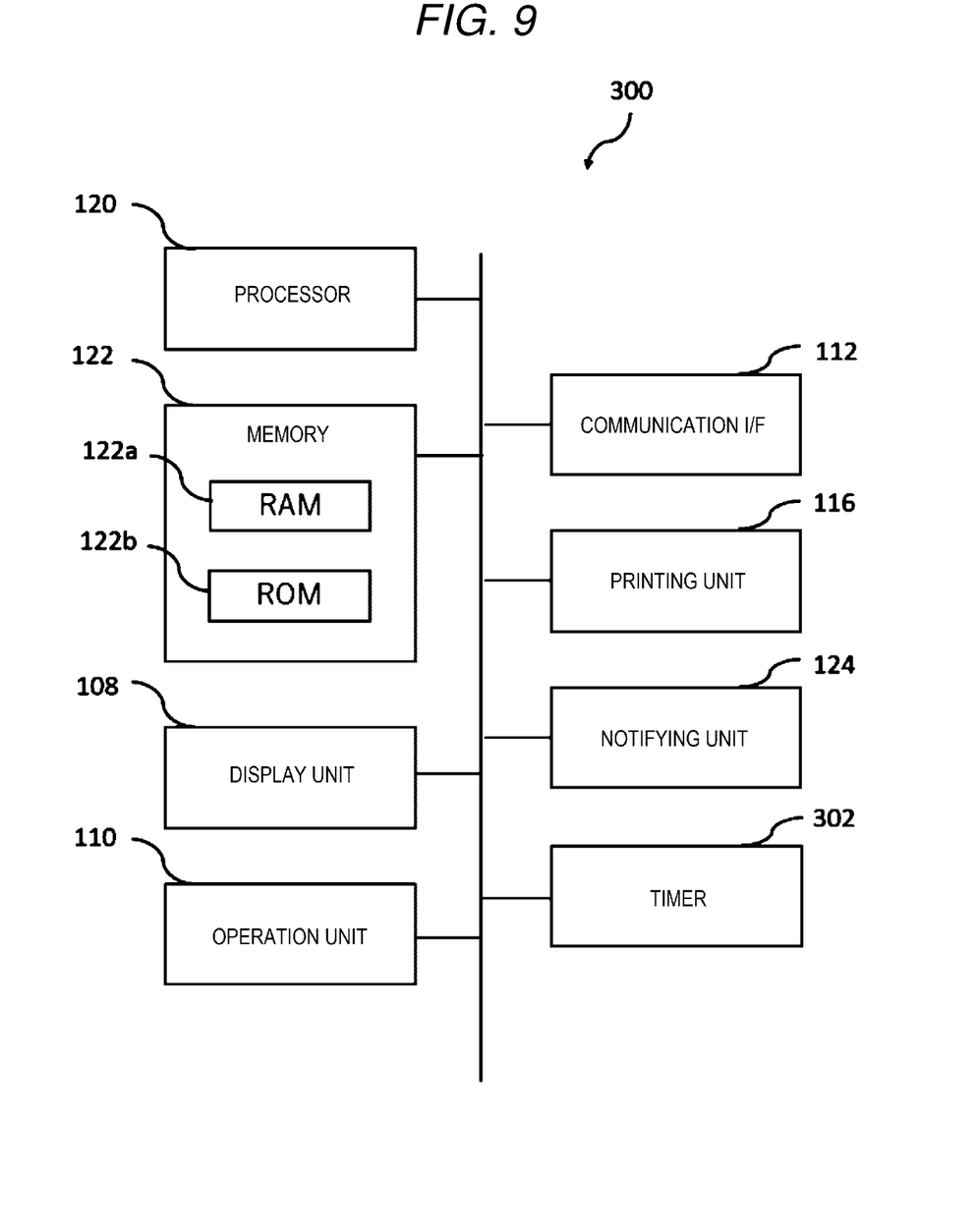
FIG. 9 is a block diagram illustrating a hardware configuration of a printer in a second embodiment.

FIG. 9 is a block diagram illustrating a hardware configuration of a printer 300 according to a second embodiment. A timer 302 measures a predetermined time. The predetermined time is, for example, an elapsed time from operation by a user or an elapsed time from a printing operation end. If a time measured by the timer 302 exceeds a preset time (for example, 10 minutes), the printer 300 shifts to the misplacement notification mode using the display unit 108 and the communication I/F 112. The timer 302 in this embodiment is realized by a CPU measuring a time but is not limited to this. A device capable of measuring a time may be separately provided as the timer 302.

Figure 10:
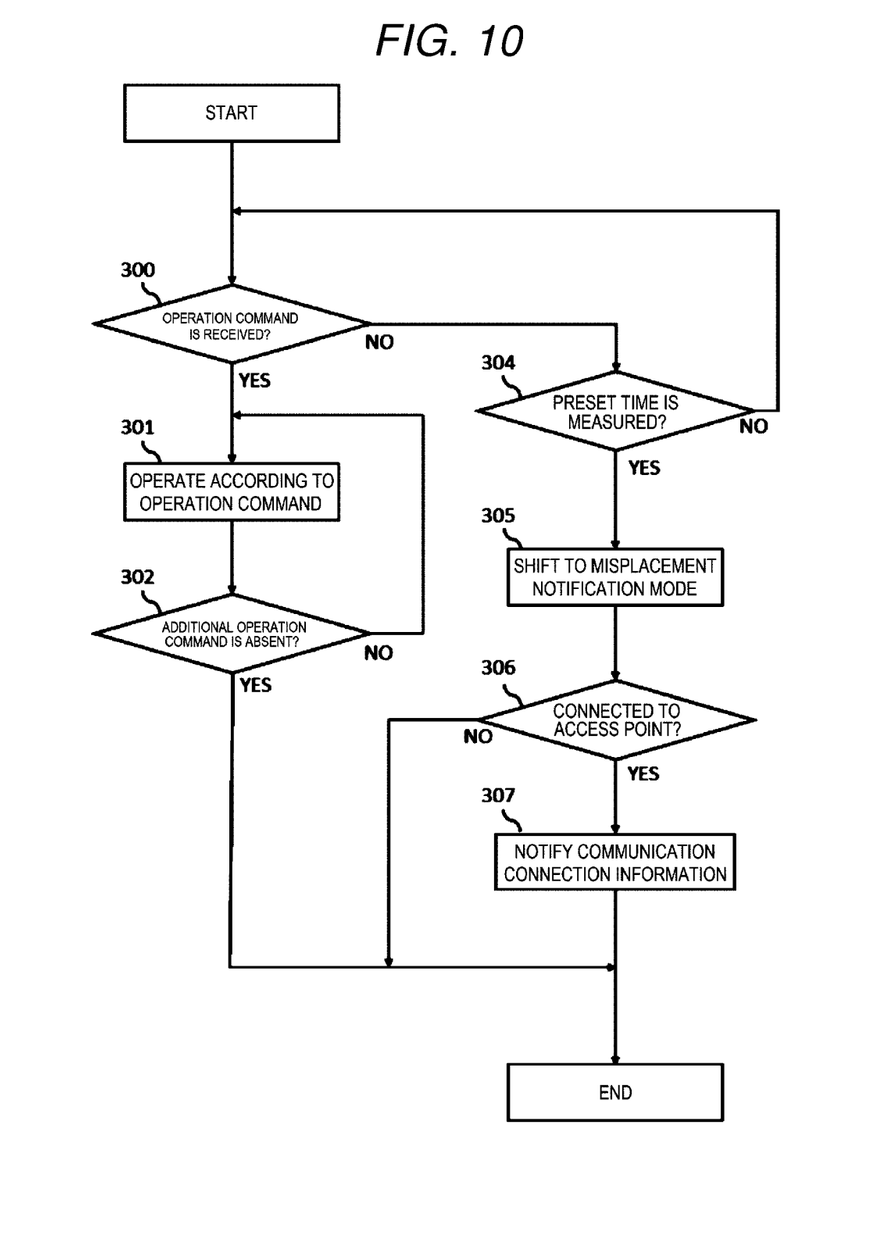
FIG. 10 is a flowchart illustrating misplacement notification processing.

FIG. 10 is a flowchart illustrating misplacement notification processing. In the following explanation, first, the printer 300 is on standby in a state in which the printer 300 is turned on.

If receiving an operation command with the operation unit 110 or the communication I/F 112 (YES in ACT 300), the printer 300 performs operation based on the received operation command (ACT 301). If an additional operation command is present (NO in ACT 302), the printer 300 performs operation according to the operation command (ACT 301).

If an additional operation command is absent in ACT 302 (YES in ACT 302), the printer 300 ends a series of processing.

If not receiving an operation command with the operation unit 110 or the communication I/F 112 in ACT 300 (NO in ACT 300), the printer 300 stays on standby until the timer 302 measures the preset time (NO in ACT 304). If the timer 302 measures the preset time in the standby state (YES in ACT 304), the printer 300 shifts to the misplacement notification mode (ACT 305). If the printer 300 is connected to an access point (YES in ACT 306), the printer 300 specifies a PC, a smartphone, or the like of a user registered as an owner of the printer 300 from information registered in the memory 122 as user information of the printer 300 and notifies the external device 200 of communication connection information including an identification ID of the access point to which the printer 300 is connected (ACT 307). Thereafter, the printer 300 ends the series of processing.

If the communication I/F 112 is not in a communicable state with the access point in ACT 306 (NO in ACT 306), the printer 300 ends the operation and ends the series of processing.

Consequently, if the printer according to this embodiment does not receive an operation command and the preset time elapses, the printer notifies an identification ID of an access point to the user. Therefore, the user receiving the notification can greatly narrow a search range for the printer.

Third Embodiment

An example in which a printer directly sends communication connection information to a smartphone or the like through the short range wireless communication not via an access point is explained. In the example explained below, BLE communication is explained as an example of short range communication means between the printer and the smartphone. However, the short range wireless communication means is not limited to this and may be Ibeacon (registered trademark) or the like. The printer may include communication means by the wireless LAN communication in addition to the short range wireless communication.

Figure 11:
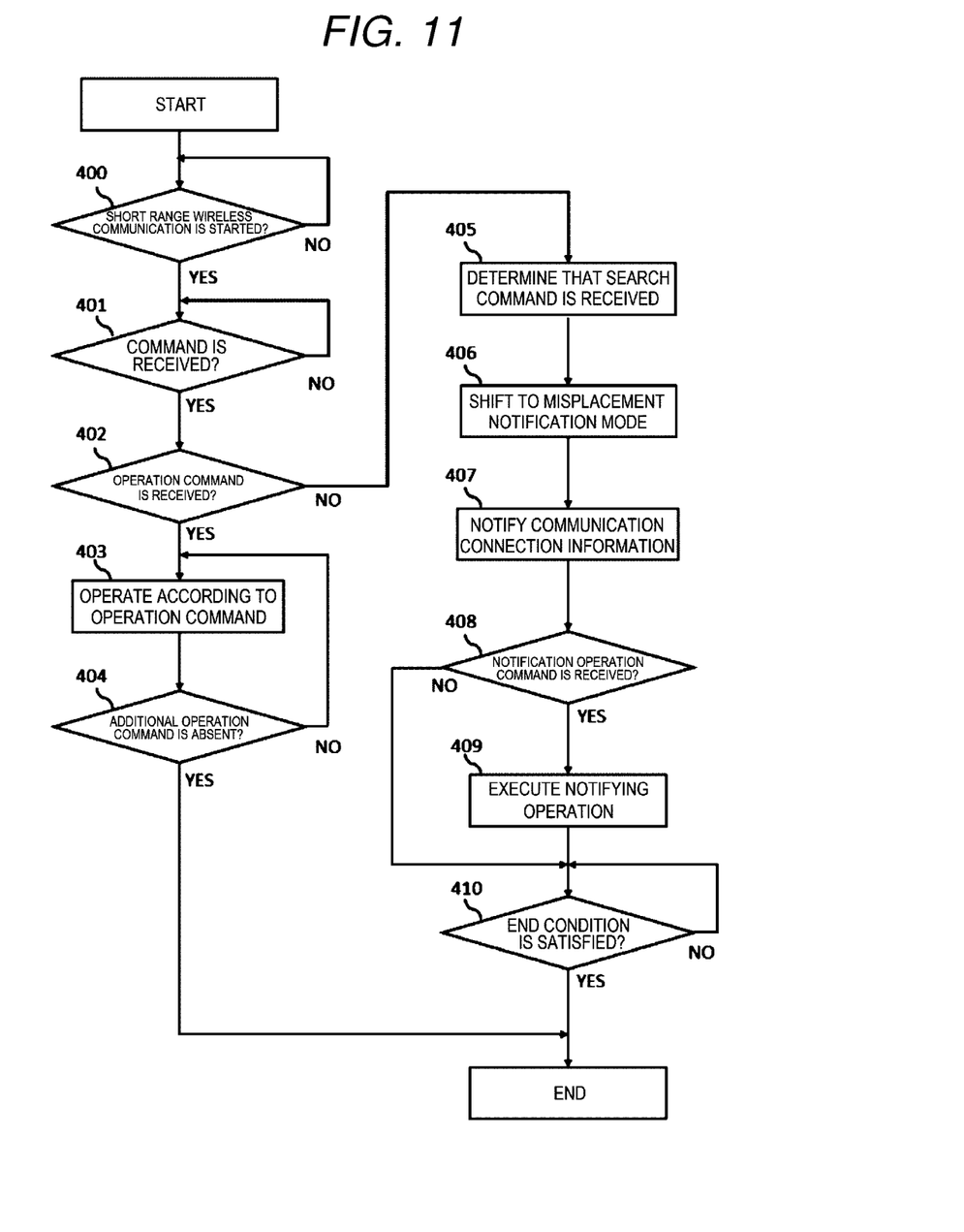
FIG. 11 is a flowchart illustrating misplacement notification processing in a third embodiment.

FIG. 11 is a flowchart illustrating misplacement notification processing. In the following explanation, first, the printer 300 is on standby in a state in which the printer 300 is turned on.

The printer 300 stays on standby until the short range wireless communication with the external device 200 is started (NO in ACT 400). If detecting that the external device 200 enters a short range wirelessly communicable range, the printer 300 starts the short range wireless communication (YES in ACT 400). If the printer 300 is connected to the external device 200 by the short range wireless communication, the printer 300 stays on standby until the printer 300 receives a command (NO in ACT 401). If receiving a command (YES in ACT 401), the printer 300 determines whether the received command is an operation command (ACT 402). If the received command is an operation command (YES in ACT 402), the printer 300 performs operation according to the received operation command (ACT 403). If an additional operation command is present (NO in ACT 404), the printer 300 performs operation according to the operation command (ACT 403).

If an additional operation command is absent in ACT 404 (YES in ACT 404), the printer 300 ends a series of processing.

In ACT 402, if not receiving an operation command with the operation unit 110 or the communication I/F 112 (NO in ACT 402), the printer 300 determines that a search command is received from the external device 200 (ACT 405). If receiving the search command from the external device 200, the printer 300 shifts to the misplacement notification mode (ACT 406). The printer 300 shifting to the misplacement notification mode notifies, with the communication I/F 112, device names of the external device 200 and the printer 300, information indicating that the printer 300 is connected by the short range wireless communication, communication connection information to the effect that the printer 300 is present near the user, and the like (ACT 407).

If receiving, from the external device 200, a notification operation command for causing the notifying unit 124 to execute notification (YES in ACT 408), the printer 300 executes a notifying operation (ACT 409). The notifying operation is operation for notifying that the printer 300 is placed to people near the printer 300 with a method of, for example, emitting sound with the notifying unit 124 of the printer 300, lighting the display unit 108, or executing printing processing. Thereafter, the printer 300 stays on standby until an end condition such as elapse of a predetermined standby time or operation of the operation unit 110 of the printer 300 by the user is satisfied (NO in ACT 410). If the end condition is satisfied (YES in ACT 410), the printer 300 ends the series of processing.

If the communication I/F 112 does not receive the notification operation commend from the external device 200 in ACT 408 (NO in ACT 408), the printer 300 advances the processing to ACT 410.

Consequently, the printer according to this embodiment can notify the user that the printer is placed near the user by communicating with the external device with the short range wireless communication means and notify the user that the printer is placed near the user by emitting sound based on a notification operation command from the external device.

The misplacement notification by the wireless LAN communication is explained in the first embodiment and the second embodiment. The misplacement notification by the short range wireless communication is explained in the third embodiment. A single printer may be able to simultaneously perform these kinds of processing. A communication method may be able to be switched as appropriate.

Fourth Embodiment

A printer that can notify that the printer is placed near a user even in a state in which the printer does not perform the wireless LAN communication and the short range wireless communication is explained. For example, if a timer measures a preset time in a non-operation time, the printer shifts to the misplacement notification mode and performs notification by, for example, emitting sound with the notifying unit 124, causing an LED to emit light, or executing printing processing. The shift to the misplacement notification mode desirably can be set and released by a user in advance.

Figure 12:
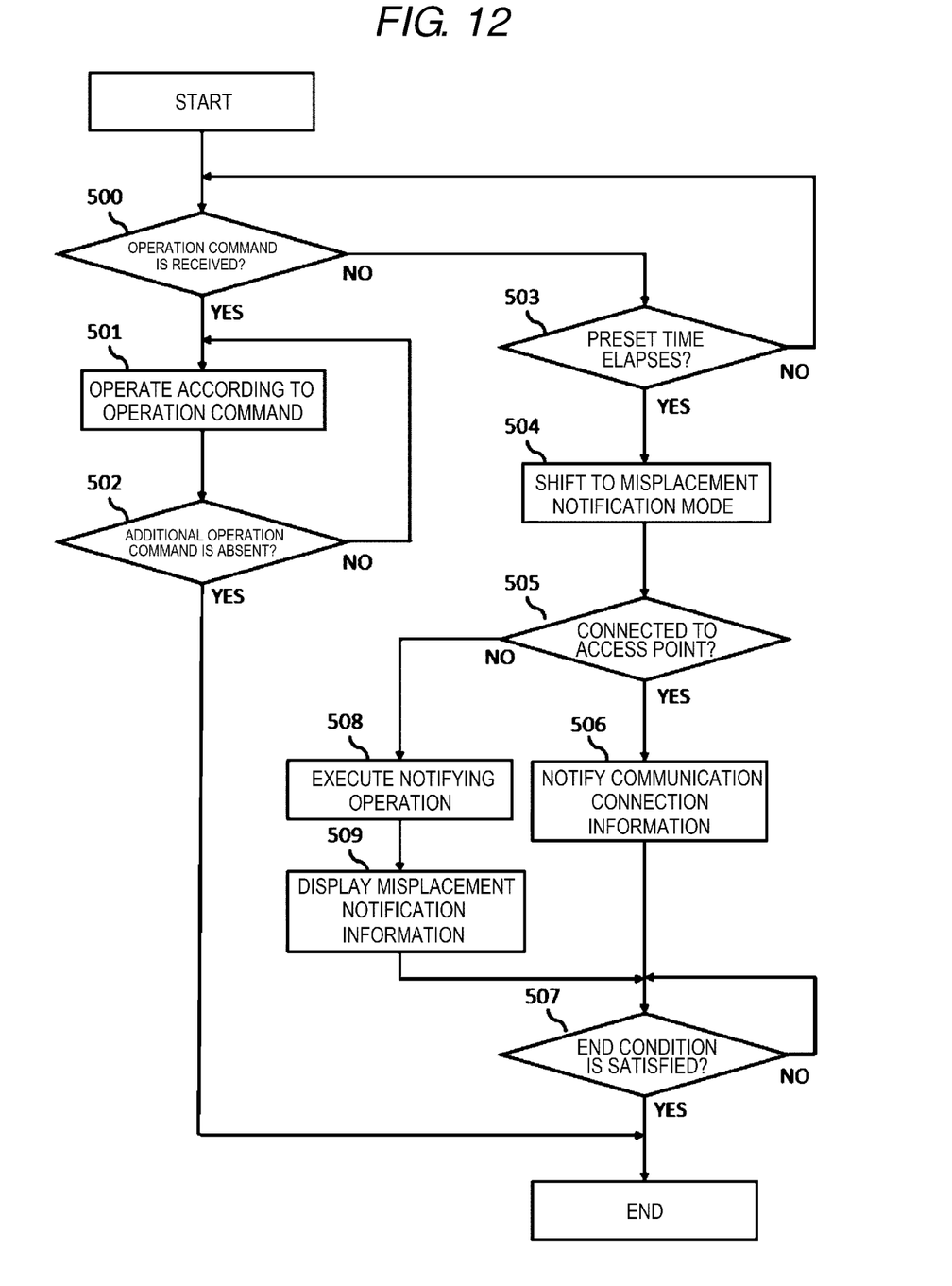
FIG. 12 is a flowchart illustrating misplacement notification processing in a fourth embodiment.

FIG. 12 is a flowchart illustrating the misplacement notification processing. In the following explanation, for convenience of explanation, the printer 300 explained in the second embodiment is explained as an example. In the following explanation, first, the printer 300 is on standby in a state in which the printer 300 is turned on.

If receiving an operation command with the operation unit 110 or the communication I/F 112 (YES in ACT 500), the printer 300 performs operation based on the received operation command (ACT 501). If an additional operation command is present (NO in ACT 502), the printer 300 performs operation according to the operation command (ACT 501).

If an additional operation command is absent in ACT 502 (YES in ACT 502), the printer 300 ends a series of processing.

If not receiving an operation command with the operation unit 110 or the communication I/F 112 in ACT 500 (NO in ACT 500), the printer 300 stays on standby for a preset time (ACT 503). The printer 300 stays on standby until the timer 302 measures the preset time (NO in ACT 503). If the timer 302 measures the preset time in the standby state (YES in ACT 503), the printer 300 shifts to the misplacement notification mode (ACT 504). In a state in which the communication I/F 112 is connected to an access point (YES in ACT 505), the printer 300 specifies a PC, a smartphone, or the like of the user of the printer 300 from information registered in the memory 122 as information concerning the user of the printer 300 and notifies the external device 200 of communication connection information including an identification ID of the access point to which the printer 300 is connected (ACT 506). Thereafter, the printer 300 stays on standby until the end condition is satisfied (NO in ACT 507). If the end condition is satisfied (YES in ACT 507), the printer 300 ends the series of processing.

If the communication I/F 112 is not connected to an access point in ACT 505 (NO in ACT 505), the notifying unit 124 performs a notifying operation for, for example, emitting sound, lighting the display unit 108, or executing printing processing (ACT 508). Further, the printer 300 displays, on the display unit 108, misplacement notification information such as a printer name and a user name registered in the memory 122 as illustrated in FIG. 6B (ACT 509). Thereafter, the printer 300 advances the processing to ACT 507.

Consequently, even if the printer does not perform wireless communication with the external device, the printer performs the notifying operation if the present time elapses in the non-operation state. Therefore, the printer can notify presence of the printer to people present near the printer.

In the embodiments of the present disclosure, the portable printer is explained as the example. However, the present disclosure is not limited to this and can be applied to an electronic device such as a smartwatch or a PC that can be connected by the wireless LAN communication or the short range wireless communication.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A printer comprising:
   a communication I/F configured to wirelessly communicate with an external device;
   a control unit configured to, if the communication I/F receives a command from the external device, control the communication I/F to notify the external device of communication connection information; and
   a printing unit configured to apply heat to a printing object to form an image, wherein
   if the communication I/F receives the command from the external device, the control unit prints notification information with the printing unit connection information.

2. The printer according to claim 1, wherein the control unit notifies the external device of the communication connection information of an access point that is transmitting a radio wave a having highest radio wave intensity among communication radio waves received via the communication I/F.

3. The printer according to claim 1, wherein the communication connection information comprises at least an identification ID of the access point or information indicating a short range wirelessly communicable state.

4. The printer according to claim 1, wherein the printer is a portable printer.

5. The printer according to claim 1, wherein the printer is a thermal printer.

6. The printer according to claim 1, wherein the communication connection information comprises location information.

7. A printer comprising:
   a communication I/F configured to wirelessly communicate with an external device;
   a timer configured to measure a time;
   a control unit configured to control the communication I/F to notify the external device of communication connection information if the timer measures a preset time in a non-operation state, and a printing unit configured to apply heat to a printing object to form an image, wherein
if the communication I/F receives a command from the external device, the control unit prints notification information with the printing unit.

8. The printer according to claim 7, wherein the control unit maintains the printer in a standby mode while the timer measures the time.

9. The printer according to claim 7, wherein the communication connection information comprises at least an identification ID of the access point or information indicating a short range wirelessly communicable state.

10. The printer according to claim 7, wherein the printer is a portable printer.

11. The printer according to claim 7, wherein the printer is a thermal printer.

12. The printer according to claim 7, wherein the communication connection information comprises location information.

13. A printer search system comprising a printer and an external device,
the printer comprising:
  a first communication I/F configured to wirelessly communicate; and
  a control unit configured to, if the first communication I/F receives a command from the external device, control the first communication I/F to notify the external device of communication connection information;
  a printing unit configured to apply heat to a printing object to form an image, wherein
  if the first communication I/F receives the command from the external device, the control unit prints notification information with the printing unit, and
the external device comprising:
  a second communication I/F configured to wirelessly communicate with the first communication I/F;
  a display unit configured to display the communication connection information acquired by the second communication I/F.

14. The printer search system according to claim 13, wherein the control unit notifies the external device of the communication connection information of an access point that is transmitting a radio wave a having highest radio wave intensity among communication radio waves received via the first communication I/F.

15. The printer search system according to claim 13, wherein the communication connection information comprises at least an identification ID of the access point or information indicating a short range wirelessly communicable state.

16. The printer search system according to claim 13, wherein the external device is a PC, tablet or smartphone.

17. The printer search system according to claim 13, wherein the communication connection information comprises location information.

* * * * *